Feb. 5, 1929.
D. E. JEWITT
1,701,373
ELECTRIC SHIP PROPULSION SYSTEM
Filed Sept. 8, 1924
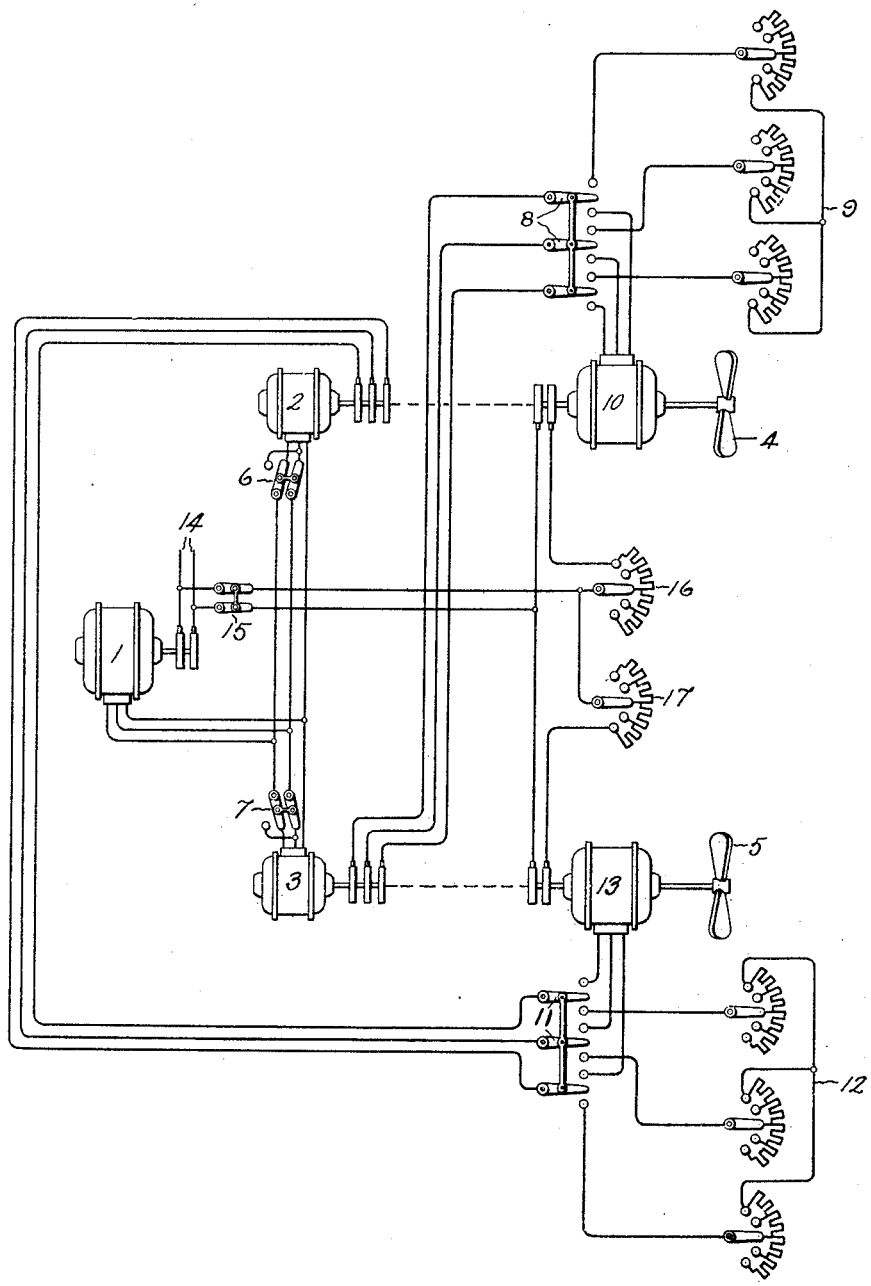
Inventor:
Dennis E. Jewitt
by
His Attorney.

Patented Feb. 5, 1929.

1,701,373

UNITED STATES PATENT OFFICE.

DENNIS E. JEWITT, OF RUGBY, ENGLAND, ASSIGNOR TO GENERAL ELECTRIC COMPANY, A CORPORATION OF NEW YORK.

ELECTRIC SHIP PROPULSION SYSTEM.

Application filed September 8, 1924, Serial No. 736,424, and in Great Britain February 2, 1924.

My invention relates to electric ship propulsion systems for operating propellers apt to be subject to unequal loads, and has for its object the provision of an improved system of this character wherein an equal division of the load between the different propellers is automatically maintained under different conditions of operation.

In the case of twin screw ships, for example, the division of load between the two propellers varies with the conditions of service. Thus, if the rudder is operated to alter the course of the ship or to compensate for a side wind, one of the propellers is subjected to a greater load than the other. Unbalance in the load may also be produced by other causes such as a discrepancy between the pitches of the propellers. It is therefore desirable that the relation between the speeds of the different propellers be varied to equalize the propeller loads. In accordance with my invention, this result is accomplished by an arrangement in which a motor aggregate comprising two motors is arranged to drive each propeller shaft and in which each motor of the different motor aggregates is connected in cascade with a motor mounted on a different propeller shaft. With this arrangement, any variation from a condition of equal load division between the different propellers automatically varies the relative speeds of the propeller motors in a manner to restore equality in their loads.

My invention will be better understood from the following description when considered in connection with the accompanying drawing and its scope will be pointed out in the appended claims.

The drawing shows a generator 1 arranged to supply current to the primary windings of induction motors 2 and 3 which are mounted on the shafts of propellers 4 and 5 respectively. Reversing switches 6 and 7 are provided for controlling the connections between the generator 1 and the induction motors 2 and 3. The secondary winding of the motor 3 is arranged to be connected through a double throw switch either to an adjustable resistor 9 which may be used for starting and for reversing the ship if desired, or to a synchronous motor 10 mounted on the shaft of the propeller 4. The secondary winding of the induction motor 2 is likewise arranged to be interconnected through a double throw switch 11, either to the adjustable resistor 12 or to a synchronous motor 13 mounted on the shaft of the propeller 5. Exciting current may be supplied through the line 14 to the generator 1 and also through switch 15 and resistors 16 and 17 respectively to the field windings of the synchronous motors 10 and 13.

The operation of my invention will be readily understood if it be assumed that the speeds of the propellers 4 and 5 are initially equal and that the torque of the propeller 5 tends to increase in value, due to turning of the ship for example, while that of the propeller 4 tends to decrease in value. When this occurs, the induction motor 3 runs at a lower speed than the induction motor 2, and the rotor current frequency of the motor 3 is increased, while that of the motor 2 is decreased due to the fact that its torque is reduced. Under these conditions, the frequency of the current supplied through the induction motor 3 to the synchronous motor 10 is increased and that of the current supplied through the motor 2 to the motor 13 tends to decrease. As a result of this interchange of power between the motor aggregates of the different propeller shafts, the speed and torque of the propeller 4 will be increased and that of the propeller 5 will be decreased until the power required to drive the ship is equally divided between the two propellers. Likewise, when the torque of the propeller 4 tends to increase and that of propeller 5 tends to decrease, there is immediately brought into operation a force which eventually equalizes the torques of the two propellers. My invention thus affords a coupling between the different propellers by which their torques may be automatically maintained at equal values under the different conditions of the ship's operation.

I have explained my invention by illustrating and describing a certain specific embodiment thereof, but it will be readily understood by those skilled in the art that the arrangement of this embodiment may be modified in certain of its details. I, accordingly, do not wish to be restricted to the particular arrangement disclosed herein by way of example for the purpose of setting forth my invention in accordance with the patent statutes. The terms of the appended claims are, therefore, not restricted to the precise arrangement disclosed, but are intended to cover all changes and modifications within the true spirit and scope of my invention.

What I claim as new and desire to secure by Letters Patent of the United States is:—

1. An electric ship propulsion system wherein a plurality of motor aggregates each comprising induction and synchronous motors are mounted on different propeller shafts, characterized by the fact that an induction motor of one of said aggregates is concatenated with a synchronous motor of another of said aggregates.

2. An electric ship propulsion system comprising a plurality of propeller shafts, a plurality of motor aggregates each arranged to drive a different one of said shafts and each comprising induction and synchronous motors, and means for connecting the induction motor of each aggregate in cascade with a synchronous motor of another aggregate.

3. An alternating current power system comprising a plurality of shafts to be driven, a plurality of motor aggregates each arranged to drive a different one of said shafts and each comprising an induction motor and a synchronous motor, and means for connecting the induction motor of each of said aggregates in cascade with the synchronous motor of another of said aggregates.

In witness whereof, I have hereunto set my hand, this 20th day of August, 1924.

DENNIS E. JEWITT.